July 6, 1926.
C. MAUTNER
1,591,926
JUNCTION BOX
Filed Nov. 21, 1924
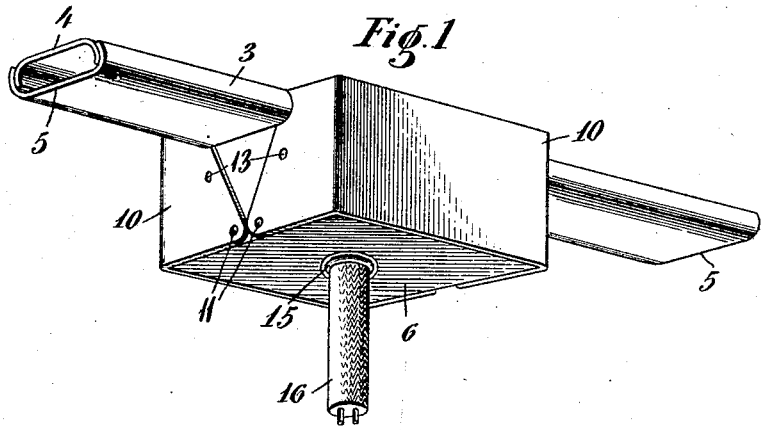
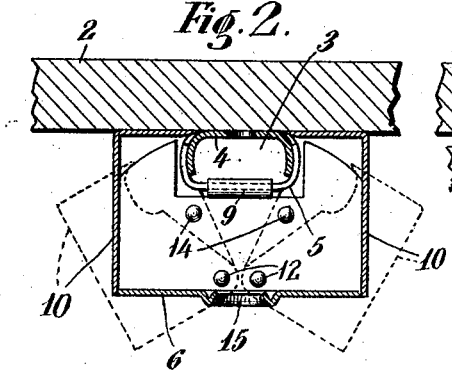
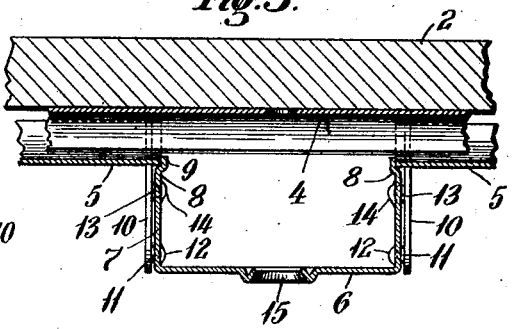
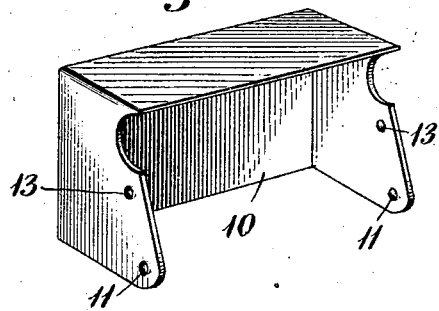
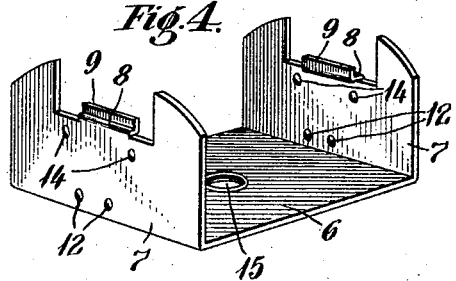
Inventor
Charles Mautner,
By his Attorney Lewis J. Doolittle.

Patented July 6, 1926.

1,591,926

UNITED STATES PATENT OFFICE.

CHARLES MAUTNER, OF BROOKLYN, NEW YORK, ASSIGNOR OF ONE-HALF TO LOUIS FREUND, OF NEW YORK, N. Y.

JUNCTION BOX.

Application filed November 21, 1924. Serial No. 751,271.

This invention relates to junction-boxes for electrical conduits, and its main object is to provide a device of this class which may be easily and cheaply manufactured, and quickly applied to a conduit or removed therefrom.

The object of the invention is to provide a junction box which may be readily secured to or removed from a conduit and which is so constructed that the elements of the box provide efficient fastening means which are easily manipulated to position the box on the conduit or remove the same therefrom.

In embodying the invention in a practical device, I provide an open-sided base member with side sections hinged thereon. These side sections close the open sides of the base member and also partially close the upper or opposite side of the box, being formed and arranged to engage the conduit and hold the box in position without the use of auxiliary fastening means, such as screws, etc.

The box members are preferably made from sheet metal and are so designed that they may be manufactured with dies, which is of great advantage from the standpoint of cost, etc., particularly in devices of this type. This construction also provides a self-contained, unitary device which meets all requirements for devices of this nature and possesses many advantages, which will be apparent from the description which follows.

The foregoing and other features of the invention are illustrated in the accompanying drawing, in which:

Fig. 1 is a perspective view of my improved junction-box attached to an electrical conduit;

Fig. 2 is a vertical section showing my adjustable junction-box attached to an electrical conduit, the dotted lines indicating the open position of the device, this position of the parts permitting removal of the box from the conduit;

Fig. 3 is a vertical section of the device, the section being taken transverse to that of Fig. 2;

Fig. 4 is a detail view, in perspective, of the open-sided base member of the junction-box;

Fig. 5 is a detail view, in perspective, of one of the hinged side sections of my device adapted to be pivoted on the base member shown in Fig. 4, and Fig. 6 is an enlarged detail, in section, illustrating the means employed herein for pivoting the side sections upon the base member of the junction-box.

Referring to the drawing, 2 designates a ceiling wall, a panel of wood, or other suitable material, upon which a conduit 3 is mounted, which, as shown, is made up of two trough-like portions 4 and 5, the portion 5 being adapted to be snappd over the portion 4 to form therewith an enclosed conduit for electrical conductors, this conduit being of the usual construction. The conduit is usually attached to the wall or ceiling 2 by screws, bolts or other suitable means, seated in the trough section 4.

The junction-box embodying my invention is adapted to receive an adjacent end or ends of a conduit, such as 3, to engage said end or ends and to be removable therefrom readily and quickly by manipulation of the members of which said junction-box is made up. These members are shown as an inner open-sided base member 6, having end portions 7 struck up at an angle to the bottom thereof, said end portions 7 each being formed with an opening adapted to receive one of the end portions of a section of conduit. A shoulder 8 at each end is struck up from the metal of the end portion 7 of said member 6. It will be seen that these shoulders 8 have a back portion 9 of sufficient height to prevent a conductor carried within the conduit 3 from coming in contact with the end of the conduit section 5, which is cut away to permit the insertion of the box and is likely to have rough or sharp edges. The upper edge of the shoulder 9 may be rounded off, if desired, to prevent any possible danger of abrasion of the conductor resting thereupon, though such rounding off will not be necessary ordinarily.

Attached to the base member 6 I have shown two enclosing side sections 10 pivoted at each end thereof to the base member 6 and adapted to be manipulated to engage the end of a conduit section 3, or to be removed therefrom. These side sections 10, together with the base member 6, form an enclosing box for the electrical connections and their terminal blocks, when closed in position on the conduit, as shown in Fig. 1. The end and top portions of the side sections 10 are cut out so as to engage partly around the conduit, when closed, and hold the box in position without the use of screws or other fastening means and, when opened, permit the removal of the box as a unit, permitting ready access to the electrical connections. The side sections 10 may be pivoted to the member 6 in any desired manner, but I prefer to use and have shown herein a simple, effective and inexpensive means for this purpose, each of said end-portions of the side sections 10 being stamped to form an interior protuberance 11 at each end thereof, said protuberance being adapted to engage in and coact with a complementary depression 12 in the end portion 7 of the base member 6 to form thereby a pivot adapted to permit opening and closing of the side sections 10.

The means employed for locking the side sections 10 in position on the base member 6 of the junction box are shown herein as another set of similar protuberances 13 struck up on the inner face of the end portions of the side sections 10 and positioned and adapted for co-action with complementary depressions 14 in the end portions 7 of the base member 6. The resiliency of the members, and especially the resiliency of the ends 7 of the member 6, permits frictional contact of the end portions of the side sections 10 with the end portions 7 of the base member 6 and the springing of the protuberance 13 into the depressions 14, the members 6 and 10 being thus held in this closed position engaging the conduit 3 until the side sections 10 are manipulated to disengage them from said conduit, whereupon the junction box as a whole may be removed therefrom.

It will be obvious that a junction-box of the type described may be made of circular or other than rectangular form, and that instead of the outlet opening 15, adapted to permit a conductor cable 16 to be led therethrough, a socket for a lamp or other fitting may be formed therein.

I have not shown the electrical connections or terminal blocks which are enclosed by the junction-box, as these may be of any of the usual forms utilized for this purpose in the trade, and the present invention has to do only with the novel features of the box proper, as herein described and shown.

It will be apparent that various changes in the details of construction shown and described may be made without departing from the spirit and scope of the invention as defined in the appended claims, and I intend that all matter contained in the preceding description or shown in the accompanying drawings shall be interpreted as illustrative merely of an operative embodiment of my invention, and not in a limiting sense.

What I claim is:

1. A junction box for electrical conduits, comprising an open-sided base member, and side sections pivotally attached to said base member closing the open sides of said base member and partially closing the opposite side of said box, engaging the conduit and holding the box in position thereon when closed.

2. A junction box for electrical conduits, comprising an open-sided base member having upwardly extending end portions, and side sections having end portions pivotally attached to the said base end portions, said end portions being formed to engage the conduit and hold the box in position thereon when closed.

3. A junction box for electrical conduits, comprising an open-sided base member having upwardly extending end portions, and side sections having end portions, said end portions of the base member and side sections being formed with complementary depressions and protuberances to provide a hinged attachment for said side sections to the base member, said end portions being formed to engage said conduit and hold the box in position thereon when closed.

4. A junction box for electrical conduits, comprising an open-sided base member having upwardly extending end portions, and side sections having end portions, said end portions of the base member and side sections being formed with complementary depressions and protuberances to provide a hinged attachment for said side sections to the base member, said end portions also being provided with another set of complementary protuberances and depressions positioned and arranged to coact and lock said side members in closed position, said end portions being formed to engage said conduit and hold the box in position thereon when closed.

5. A junction box for electrical conduits, comprising an open-sided base member having upwardly extending resilient end portions, and side sections having resilient end portions, said end portions of the base member and side sections being formed with complementary depressions and protuberances to provide a hinged attachment for said side sections to the base member, said resilient end portions also being provided with another set of complementary protuberances and depressions positioned and arranged to coact to lock said side members in closed position, said end portions being formed to engage said conduit and hold the box in position thereon when closed.

6. A junction box for electrical conduits, comprising an open-sided base member having upwardly extending end portions provided with a shoulder offset therefrom in position to extend over the inner edge of the end of the conduit when the box is in place and adapted to position the box thereon, and side sections having end portions pivotally attached to said base end portions, said end portions being formed to engage the conduit and hold the box in position thereon when closed.

7. A junction box for electrical conduits, comprising an open-sided base member having upwardly extending end portions each formed with an opening in which the conduit is received and the box thereby positioned transversely thereon, the end portions of said base member being also provided with a shoulder offset therefrom in said opening in position to extend over the inner edge of the ends of the conduit when the box is in place and adapted to position the box thereon longitudinally, and side sections having end portions pivotally attached to said base end portions, said end portions being formed to engage the conduit and hold the box in position thereon when closed.

Signed at New York, in the county of New York, and State of New York, this 3d day of November, A. D. 1924.

CHARLES MAUTNER.